United States Patent
Silkowski

(10) Patent No.: US 11,434,831 B2
(45) Date of Patent: Sep. 6, 2022

(54) GAS TURBINE COMBUSTOR HAVING A PLURALITY OF ANGLED VANES CIRCUMFERENTIALLY SPACED WITHIN THE COMBUSTOR

(71) Applicant: General Electric Company, Schenectady, NY (US)

(72) Inventor: Peter Daniel Silkowski, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 552 days.

(21) Appl. No.: 16/295,542

(22) Filed: Mar. 7, 2019

(65) Prior Publication Data
US 2020/0025110 A1    Jan. 23, 2020

Related U.S. Application Data

(60) Provisional application No. 62/675,284, filed on May 23, 2018.

(51) Int. Cl.
*F02C 9/22* (2006.01)
*F02C 3/14* (2006.01)
(Continued)

(52) U.S. Cl.
CPC .................. *F02C 9/22* (2013.01); *F02C 3/04* (2013.01); *F02C 3/14* (2013.01); *F02C 6/003* (2013.01);
(Continued)

(58) Field of Classification Search
CPC ...... F02C 9/22; F02C 3/04; F02C 3/14; F02C 6/003; F02C 3/145; F23R 3/002;
(Continued)

(56) References Cited

U.S. PATENT DOCUMENTS

| 2,548,975 A | 4/1951 | Hawthorne |
| 4,018,043 A | 4/1977 | Clemmens |

(Continued)

FOREIGN PATENT DOCUMENTS

| CN | 1133936 A | 10/1996 |
| CN | 101737167 A | 6/2010 |

(Continued)

OTHER PUBLICATIONS

D. Rauch; NASA CR-120,992,Design study of an air pump and integral lift engine ALF-504 using the Lycoming 502 core; Jul. 1972.*

(Continued)

*Primary Examiner* — William H Rodriguez
*Assistant Examiner* — Rodolphe Andre Chabreyrie
(74) *Attorney, Agent, or Firm* — Venable LLP; Elizabeth C. G. Gitlin; Michele V. Frank

(57) ABSTRACT

A gas turbine engine includes: a compressor section including a compressor mean radius; a combustor section fluidly coupled downstream of the compressor section and include a combustor mean radius; and a turbine section fluidly coupled downstream of the combustor section and a turbine mid-span radius. The combustor mean radius is greater than each of the compressor mean radius and the turbine mid-span radius.

20 Claims, 14 Drawing Sheets

(51) Int. Cl.
*F23R 3/02* (2006.01)
*F02C 6/00* (2006.01)
*F02C 3/04* (2006.01)

(52) U.S. Cl.
CPC ............ *F23R 3/02* (2013.01); *F05D 2220/32* (2013.01); *F05D 2240/127* (2013.01); *F05D 2240/128* (2013.01)

(58) Field of Classification Search
CPC ...... F23R 3/02; F23R 3/06; F23R 3/12; F23R 3/14; F23R 3/16; F23R 3/42; F23R 3/26; F23R 3/22; F23R 3/54; F05D 2220/32; F05D 2240/127; F05D 2240/128
See application file for complete search history.

(56) References Cited

U.S. PATENT DOCUMENTS

| | | | |
|---|---|---|---|
| 5,197,290 A | 3/1993 | Lee et al. | |
| 5,797,268 A | 8/1998 | Ryan | |
| 7,003,961 B2 | 2/2006 | Kendrick et al. | |
| 7,628,020 B2 | 12/2009 | Alkabie et al. | |
| 8,459,041 B2* | 6/2013 | Flanagan | F01D 9/023 60/796 |
| 8,701,415 B2* | 4/2014 | Flanagan | F01D 11/005 60/752 |
| 8,904,799 B2* | 12/2014 | Toqan | F23R 3/002 60/752 |
| 9,134,030 B2 | 9/2015 | Bathina et al. | |
| 2011/0209482 A1 | 9/2011 | Toqan et al. | |
| 2014/0260318 A1 | 9/2014 | Willis et al. | |
| 2015/0323185 A1* | 11/2015 | Silkowski | F04D 29/563 60/748 |
| 2017/0343015 A1* | 11/2017 | Nolcheff | F01D 5/16 |

FOREIGN PATENT DOCUMENTS

| | | | |
|---|---|---|---|
| CN | 106050313 A | 10/2016 | |
| CN | 106437869 A | 2/2017 | |
| CN | 106687666 A | 5/2017 | |
| EP | 0590297 A1 | 4/1994 | |
| GB | 586556 A | 3/1947 | |
| WO | WO-2016039918 A1 * | 3/2016 | ........... F01D 17/162 |

OTHER PUBLICATIONS

Spence et al., Abstract from "A Direct Performance Comparison Of Vaned And Vaneless Stators For Radial Turbines", Journal of Turbomachinery, Jan. 11, 2006, vol. 129 Issue: 1 http://turbomachinery.asmedigitalcollection.asme.org/article.aspx?articleid=1467361.

* cited by examiner

GAS TURBINE COMBUSTOR HAVING A PLURALITY OF ANGLED VANES CIRCUMFERENTIALLY SPACED WITHIN THE COMBUSTOR

The present application claims priority to U.S. Ser. No. 62/675,284 filed on May 23, 2018.

BACKGROUND

The present disclosure relates generally to turbine engines and, more specifically, to combustor architectures that provide desired downstream conditions.

A conventional gas turbine engine typically includes a compressor for compressing air that is mixed with fuel and ignited in a combustor for generating a high pressure, high temperature gas stream, referred to as combustion gas. The combustion gases flow to a turbine, where they are expanded, converting thermal energy from the combustion gases to mechanical energy for driving a shaft to power the compressor and produce output power for powering an electrical generator or to produce thrust in Aviation applications, for example.

In at least some known gas turbines, a first set of guide vanes (or diffuser) is coupled between an outlet of the compressor and an inlet of the combustor. The first set of guide vanes reduces angular momentum, thus reducing swirl (i.e., removing bulk swirl) and flow angle of a flow of air discharged from the compressor such that the flow of air is channeled in a substantially axial direction towards the combustor. A second set of guide vanes (or first stage turbine nozzle) is coupled between an outlet of the combustor and an inlet of the turbine. The second set of guide vanes facilitates increasing angular momentum, swirl (i.e., reintroducing bulk swirl) of a flow of combustion gas discharged from the combustor such that flow angle requirements for the inlet of the turbine are satisfied. However, redirecting the flows of air and combustion gas with the first and second sets of guide vanes increases operating inefficiencies of the gas turbine. Moreover, including additional components, such as the first and second sets of guide vanes generally adds weight, cost, and complexity to the gas turbine.

Bulk swirl combustors (opened or confined) may be used to provide the necessary swirl, flow angles and flow conditions (i.e., angular momentum) thereby reducing or eliminating the need for either the first or second sets of guide vanes, or possibly both.

SUMMARY OF THE INVENTION

In one aspect, a turbine engine includes a large radius combustor including inner and outer flow paths that are curved radially outwardly upstream of the heat addition in the combustor section and radially inwardly downstream of heat addition in the combustor section.

In another aspect, a gas turbine engine includes: a compressor section including a compressor mean radius; a combustor section fluidly coupled downstream of the compressor section and include a combustor mean radius; and a turbine section fluidly coupled downstream of the combustor section and a turbine mid-span radius. The combustor mean radius is greater than each of the compressor mean radius and the turbine mid-span radius.

In another aspect, a gas turbine engine includes: a compressor section including: a compressor mean radius; at least one compressor rotor stage; and a variable compressor vane (VCV). The gas turbine engine also includes: a combustor section fluidly coupled downstream of the compressor section and including a combustor mean radius; and a turbine section fluidly coupled downstream of the combustor section and including a turbine mid-span radius. The variable compressor vane is downstream of the last compressor rotor stage.

In another aspect, a gas turbine engine includes: a compressor section including a compressor mean radius; and a combustor section fluidly coupled downstream of the compressor section and including: a combustor mean radius; and a plurality of angled vanes. The gas turbine engine also includes a turbine section fluidly coupled downstream of the combustor section and including a turbine mid-span radius. The plurality of angled vanes guide air through the combustor section while heat is added to the air.

In another aspect, a combustor assembly includes active variable flow swirling mechanisms, which may also be used to throttle the machines flow capacity.

In another aspect, a combustor assembly includes confining walls to direct the increased velocity resulting from heat addition.

In another aspect, a turbine assembly includes a turbine rotor stage (i.e., rather than a turbine nozzle stage) immediately downstream of the combustion section.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
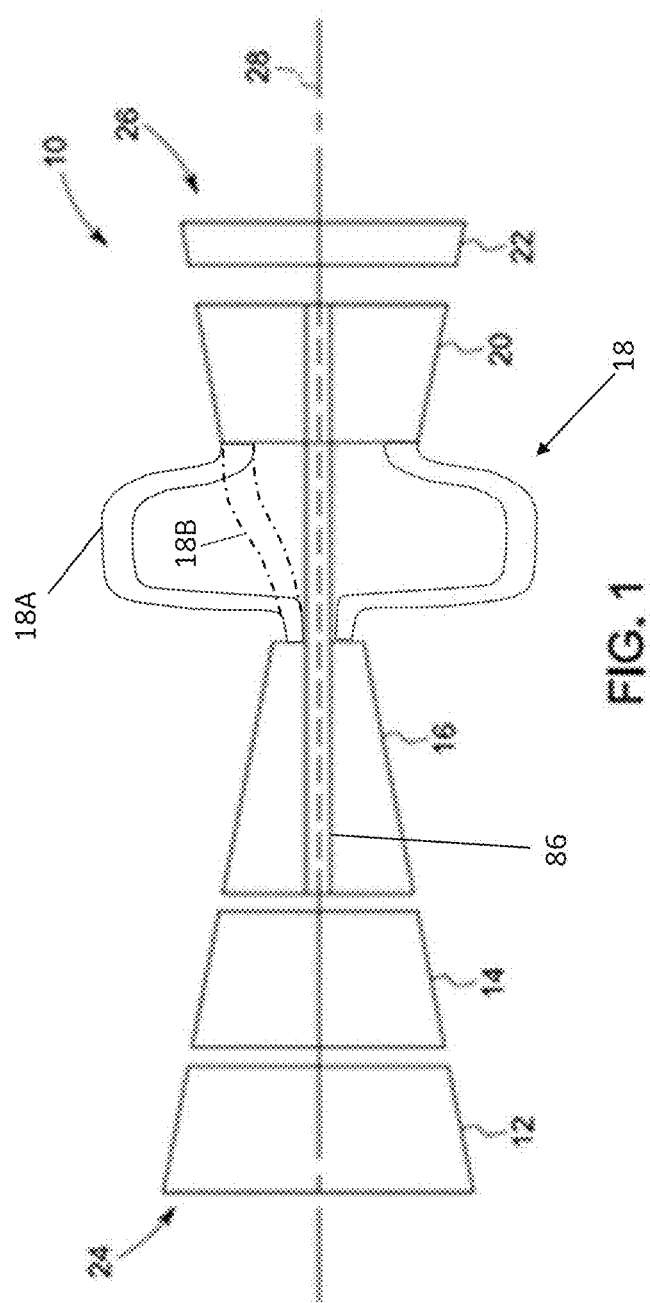
FIG. 1 is a schematic illustration contrasting a gas turbine engine of the present embodiments with an exemplary gas turbine engine.

Unless otherwise indicated, the drawings provided herein are meant to illustrate features of embodiments. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the term "axial" refers to a direction aligned with a central axis or shaft of the gas turbine engine. An axially forward end of the gas turbine engine is the end proximate the fan and/or compressor inlet where air enters the gas turbine engine. An axially aft end of the gas turbine engine is the end of the gas turbine proximate the engine exhaust where low pressure combustion gases exit the engine via the low pressure (LP) turbine.

As used herein, the term "circumferential" refers to a direction or directions around (and tangential to) the circumference of an annulus of the gas turbine, or for example the circle defined by the swept area of the turbine blades. As used herein, the terms "circumferential" and "tangential" are synonymous.

As used herein, the term "radial" refers to a direction moving outwardly away from the central axis of the gas turbine. A "radially inward" direction is aligned toward the central axis moving toward decreasing radii. A "radially outward" direction is aligned away from the central axis moving toward increasing radii.

As used herein, the term "bulk swirl" refers to swirling of compressed air and/or combustion gases within a gas turbine annulus around an engine centerline.

As used herein, the term "confined swirl" refers to structures used to increase the magnitude of bulk swirl (angular momentum) induced by heat addition in the combustor section.

As used herein, the terms "angular momentum," "swirl," "tangential flow," and "flow angle" describe engineering principles that are correlated.

FIG. 1 is a schematic illustration of an exemplary turbine engine 10 including a fan assembly 12, a low-pressure or booster compressor assembly 14, a high-pressure compressor assembly 16, and a combustor assembly 18. The combustor assembly 18 includes a contoured flow-path 18A of the present embodiments and an exemplary gas turbine engine combustor flow-path 18B (illustrated with dashed-lines in FIG. 1). The magnitude of the contouring of the contoured flow-path 18A of the present embodiments is dramatically increased in contrast to exemplary gas turbine engine combustor flow-path 18B. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Turbine engine 10 has an intake 24 and an exhaust 26. Turbine engine 10 further includes a centerline 28 about which fan assembly 12, booster compressor assembly 14, high-pressure compressor assembly 16, and turbine assemblies 20 and 22 rotate.

In operation, air entering turbine engine 10 through intake 24 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 26. A high-pressure shaft 86, is concentrically disposed about the centerline 28 and mechanically couples the high-pressure compressor assembly 16 to the high-pressure turbine assembly 20. The embodiments, combustor and turbine engine described herein are applicable to several possible engine architectures including, but not limited to, turboshaft engines, aircraft engines, turboprop engines, turbofan engines, turbojet engines, geared architecture engines, direct drive engines, land-based gas turbine engines, etc.

Figure 2:
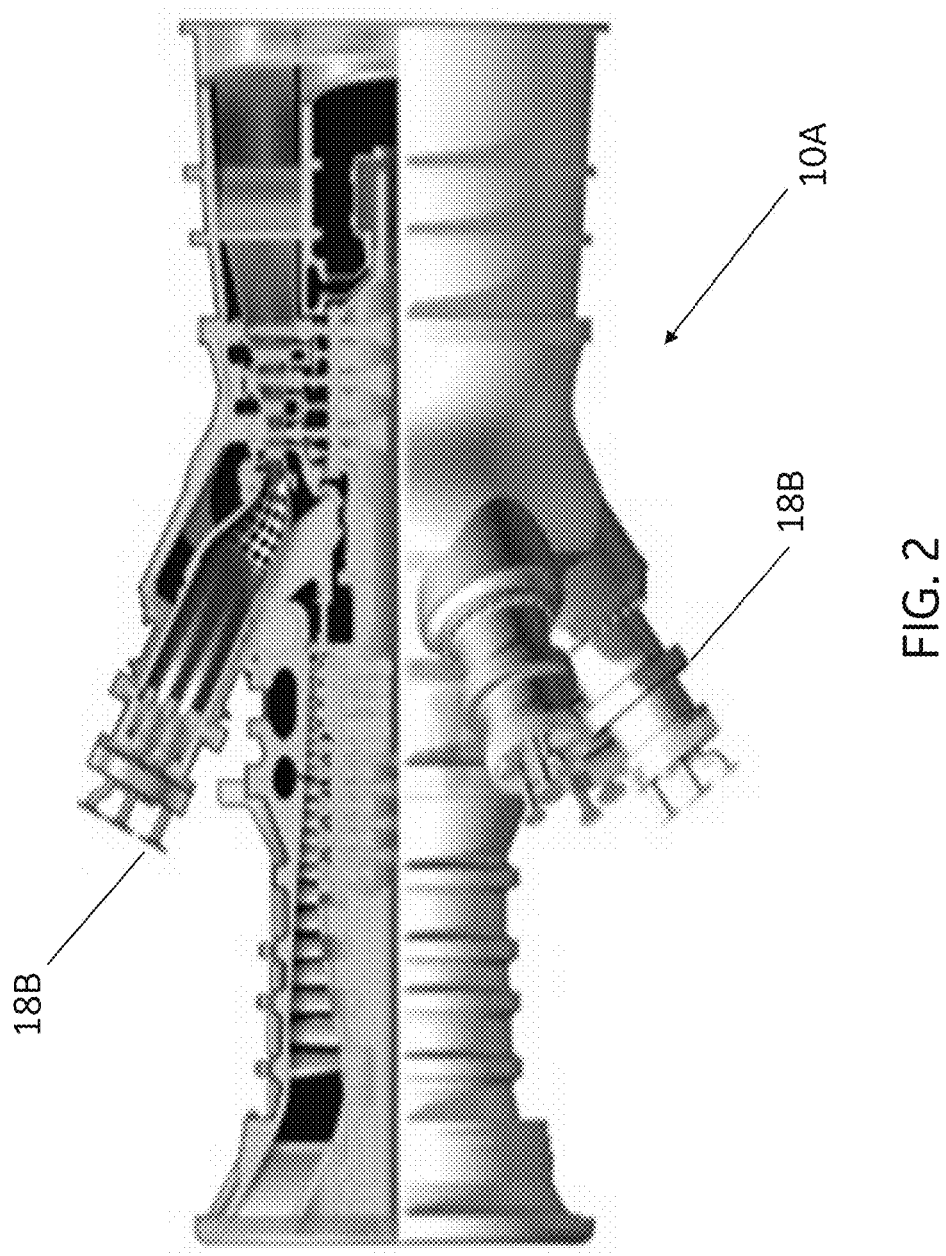
FIG. 2 illustrates an embodiment of a gas turbine engine including can-style combustor assemblies.

FIG. 2 illustrates an embodiment of a gas turbine engine 10A including can-style combustor assemblies 18B, an engine architecture to which the present embodiments are also applicable.

Figure 3:
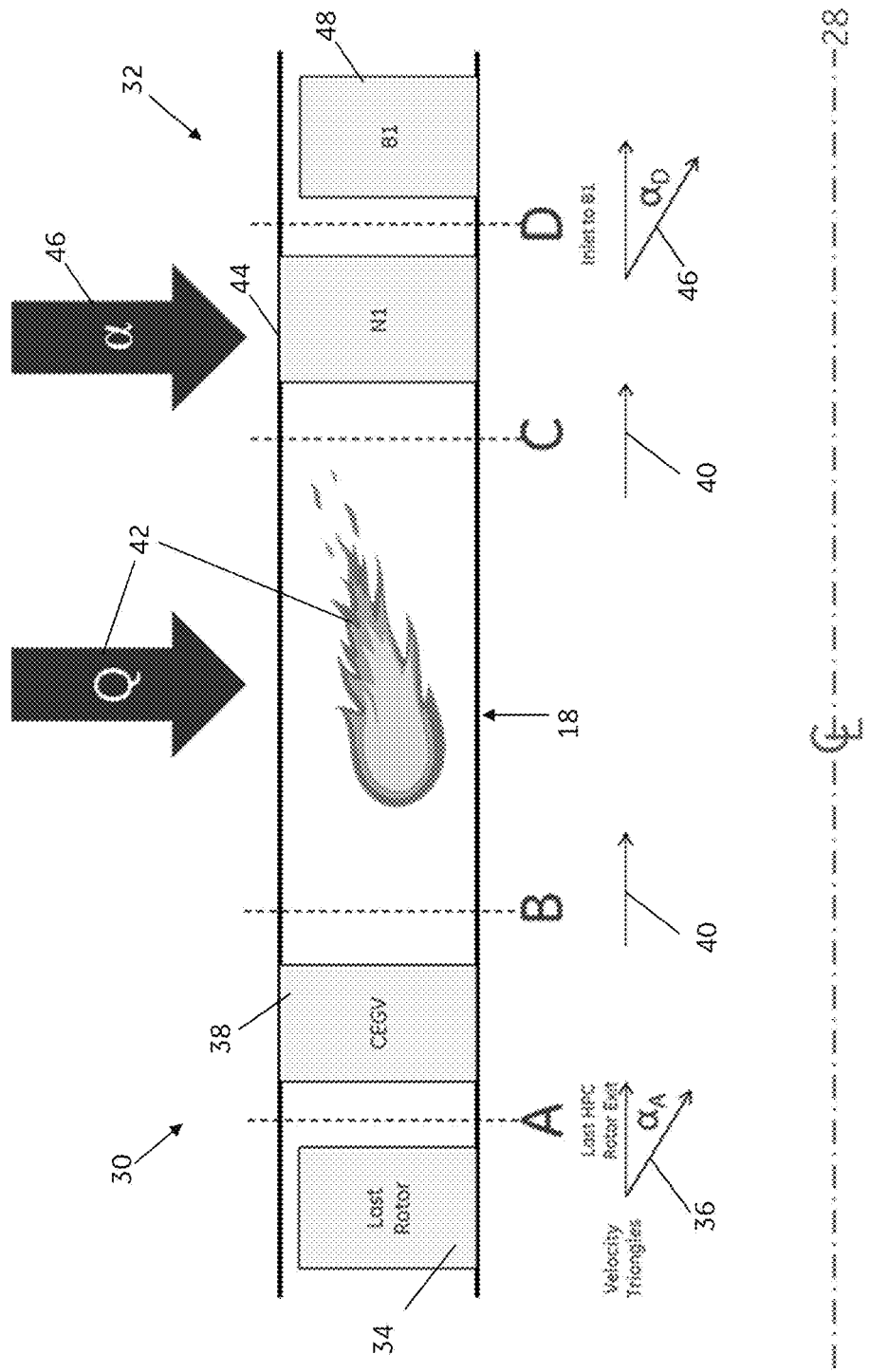
FIG. 3 is a diagrammatic schematic of the axially aft end of the compressor, the combustor and the axially fore end of the turbine engine.

FIG. 3 is a diagrammatic schematic of the axially aft end 30 of the compressor, the combustor and the axially fore end 32 of the turbine engine 10. The compressed airflow exists the last stage compressor rotor 34 at compressor rotor exit angle 36, $\alpha_A$ and enters the compressor exit guide vane 38 where the flow is turned in an axial direction 40 at station B (angular momentum decreases). Between station B and C, heat 42 is added in the combustor section 18. At station C, the combustor flow exits the combustor in an axial direction 40 and enters the first stage turbine nozzle 44 where the flow is redirected to a turbine inlet angle 46, $\alpha_D$ (angular momentum increases). Stated otherwise, the flow enters the compressor exit guide vane 38 where angular momentum decreases only to then be increased at the first stage turbine nozzle 44.

Figure 4:
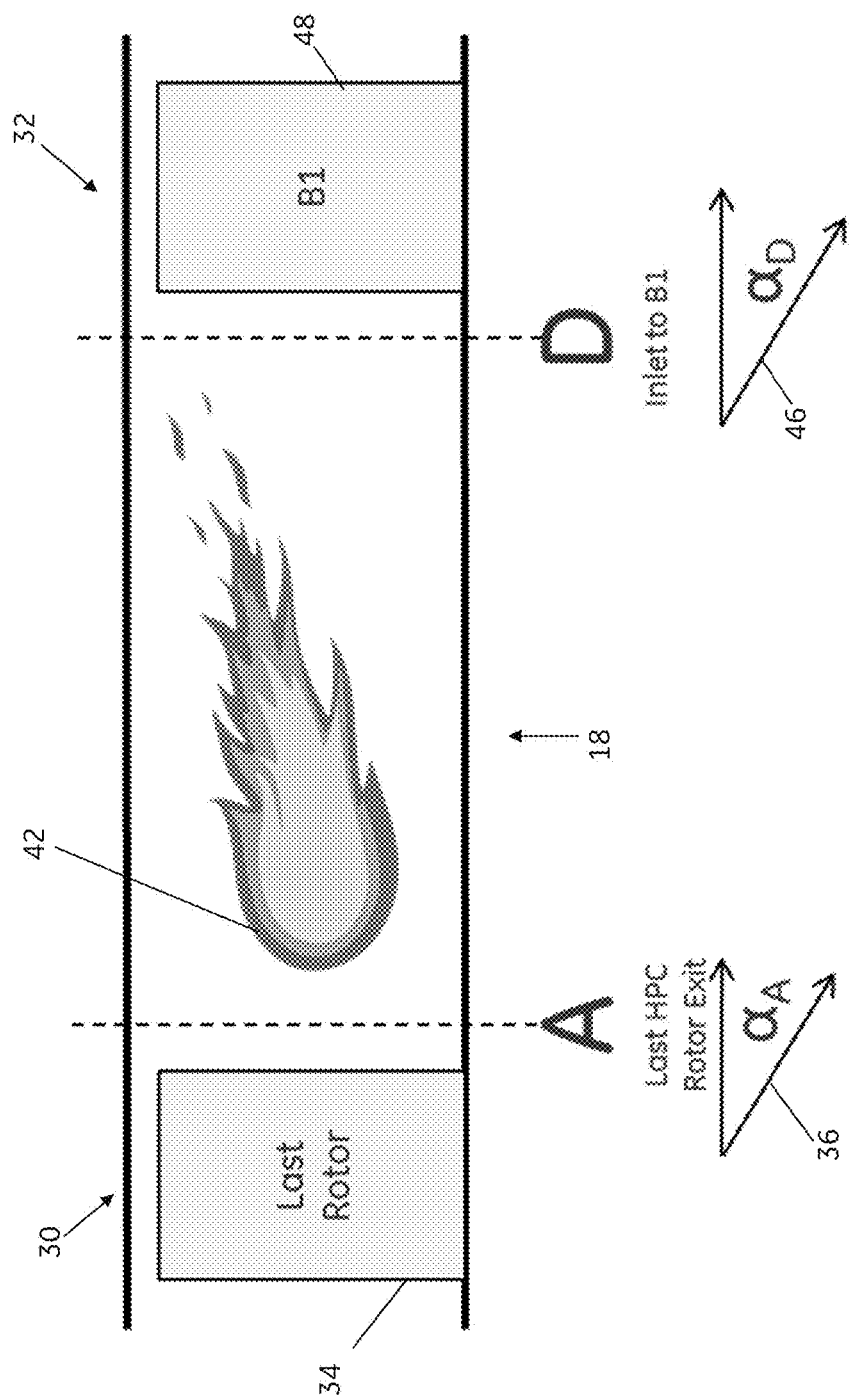
FIG. 4 is a diagrammatic schematic of the axially aft end of the compressor, the combustor and the axially fore end of the turbine engine.

FIG. 4 is a diagrammatic schematic of the axially aft end 30 of the compressor, the combustor and the axially fore end 32 of the turbine without a last stage compressor vane and without a first stage turbine nozzle. The airflow exits the last stage compressor rotor 34 at compressor rotor exit angle 36, $\alpha_A$ and enters the combustor section 18 where heat 42 is added. The combustor flow exits the combustor 18 and enters the first stage turbine rotor 48 at turbine inlet angle 46, $\alpha_D$. In operation, the flow angle may change as heat 42 is added in the combustor 18 to the compressed air in the form of ignited fuel. The change in flow angle may differ at various operating conditions from low power to high power, but generally the flow angle will decrease with heat addition. Therefore, it may be desirable for flow to exit the last stage compressor rotor 34 with increased flow angle ($\alpha_A > \alpha_D$) such that flow enters the first stage turbine rotor 48 at the correct angle and flow conditions.

Figure 5:
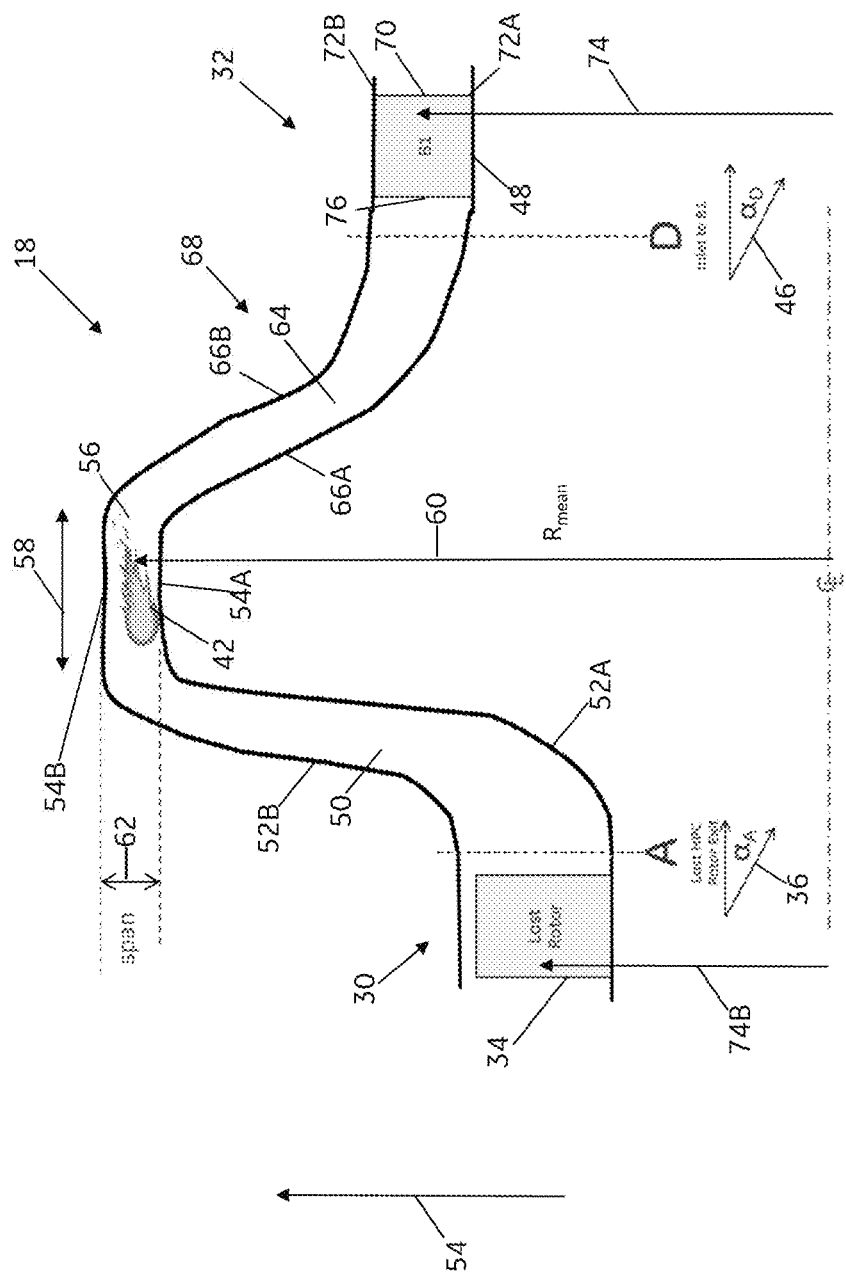
FIG. 5 is a cross-section side view of an exemplary combustor section.

FIG. 5 is a cross-section side view of an exemplary combustor section 18 of the present embodiments, including the axially aft end 30 of the compressor 16, and the axially forward end 32 of the turbine section 20. The combustor section 18 of FIG. 5 may be used in connection with the embodiment of FIG. 4 in which neither a last stage compressor vane 38 nor a first stage turbine vane (or nozzle) 44 is required to provide the required flow angles. The embodiment of FIG. 5 provides a combustor geometry that balances the flow angle, among other parameters (e.g., angular momentum, temperature and pressure). The combustor geometry is comprised of three sections (a combustor inlet 50, a combustor heat addition portion 58, and combustor exit 68) with purposefully designed flow path contouring such that conservation of angular flow momentum and flow changes with heat addition will yield the required conditions at the turbine rotor inlet, while minimizing losses and cooling requirements. The flow path contouring varies with axial direction in such a manner as to purposefully achieve specific flow conditions at various stations throughout the combustor section 18, via a compressor mean radius 74B, a combustor mean radius 60, a turbine mean radius 74 and span 62.

The combustor inlet 50 curves radially outward to reduce the flow Mach number. The combustor heat addition portion 58 further adapts the span 62 to further manage Mach numbers and hence minimize losses (Rayleigh) and cooling requirements. Stated otherwise, the span is another design parameter that can be varied to achieve the appropriate flow conditions at each station. In one embodiment, the gas turbine engine 10 may include an intentionally-varied span 62 to achieve the appropriate flow conditions at each station (minimizing losses and providing the appropriate flow conditions to the first stage turbine rotor 76). Thus, the present embodiments may enable the elimination of the first stage nozzle, due to the radius variation and/or span tailoring. The combustor exit 64 curves radially inward to create the appropriate flow angle (swirl) into the first stage turbine rotor 48. This out and back-in configuration would be desired even in examples where the compressor exit at station A and first stage turbine inlet 48 at station D are at roughly the same radii (i.e., compressor mean radius 74B may be approximately equal to turbine mean radius 74 (for example within about 5% or about 10%) or may be different than the turbine mean or mid-span radius 74). This differs from the state-of-the-art in which the combustor roughly connects the compressor exit to the turbine inlet in a direct and substantially monotonic fashion (i.e., continually increasing or decreasing radius).

As illustrated in FIG. 5, the combustor section 18 stretches from station A to station D and includes a combustor inlet flow path 50 that curves radially outward from an exit of the last stage compressor rotor 34. Both a combustor inlet inner wall 52A and the combustor inlet outer wall 52B curve steeply in a radially outward direction 54 within the combustor section 18. The combustor inlet inner wall 52A and the combustor inlet outer wall 52B define the radially inner and radially outer boundaries of the combustor inlet flow path 50, respectively. Upon reaching the heat addition portion 58, a combustor inner wall 54A and a combustor outer wall 54B define a combustor cavity 56 in which heat 42 is added in the form of ignited fuel.

Still referring to FIG. 5, the combustor inner wall 54A and the combustor outer wall 54B are formed such that the annular combustor cavity 56 defines a combustor heat addition portion 58 which includes a substantially axial orientation. In addition, the combustor heat addition portion 58 has a combustor mean radius 60 which is the average of the radius of the combustor inner wall 54A and the combustor outer wall 54B, defined at the combustor heat addition portion 58. The radial distance between the combustor inner wall 54A and the combustor outer wall 54B defines a combustor span 62. The combustor section 18 includes a combustor exit 68 downstream of the combustor inner wall 54A and the combustor outer wall 54B such that combustion gases flow into the combustor exit 68 in which both a combustor exit inner wall 66A and a combustor exit outer wall 66B define a combustor exit flow path 64, which curves radially inward.

Referring still to FIG. 5, the combustor flow exits the combustor exit 68 at station D and enters the turbine section 20 at the first stage turbine blade 48. A first stage turbine flow path 70 is defined between a turbine outer wall 72B and a turbine inner wall 72A, the turbine outer wall 72B defining the radially outer boundary of the turbine flow path 70 and the turbine inner wall 72A defined the radially inner boundary of the turbine flow path 70. A turbine mid-span radius 74 is defined as the average of the radius of the turbine inner wall 72A and the radius of the turbine outer wall 72B, both defined at a first stage turbine rotor (or blade) leading edge 76. In one embodiment, the combustor mean radius 60 is between about 1.5 and about five times the turbine mid-span radius 74. In another embodiment, the combustor mean radius 60 may be between about 2.0 and about 4.0 times the turbine mid-span radius 74. In another embodiment, the combustor mean radius 60 may be between about 2.5 and about 3.5 times the turbine mid-span radius 74. As such, the combustor 18 of the present embodiments is a large radius combustor. In another embodiment, the gas turbine includes inner and outer flow paths that are curved radially outwardly upstream of the heat addition in the combustor section and radially inwardly downstream of heat addition in the combustor section. In another embodiment, the combustor mean radius 60 is greater than both the turbine mid-span radius 74 and compressor mean radius 74B. In another embodiment, the combustor mean radius 60, the turbine mid-span radius 74, and compressor mean radius 74B are all different (i.e., they all include different radii). The gas turbine inner and outer flow paths include the combustor inlet inner and outer flow paths, 52A and 52B, the combustor inner and outer flow paths, 54A and 54B, and the combustor exit inner and outer walls, 66A and 66B, respectively.

Figure 6:
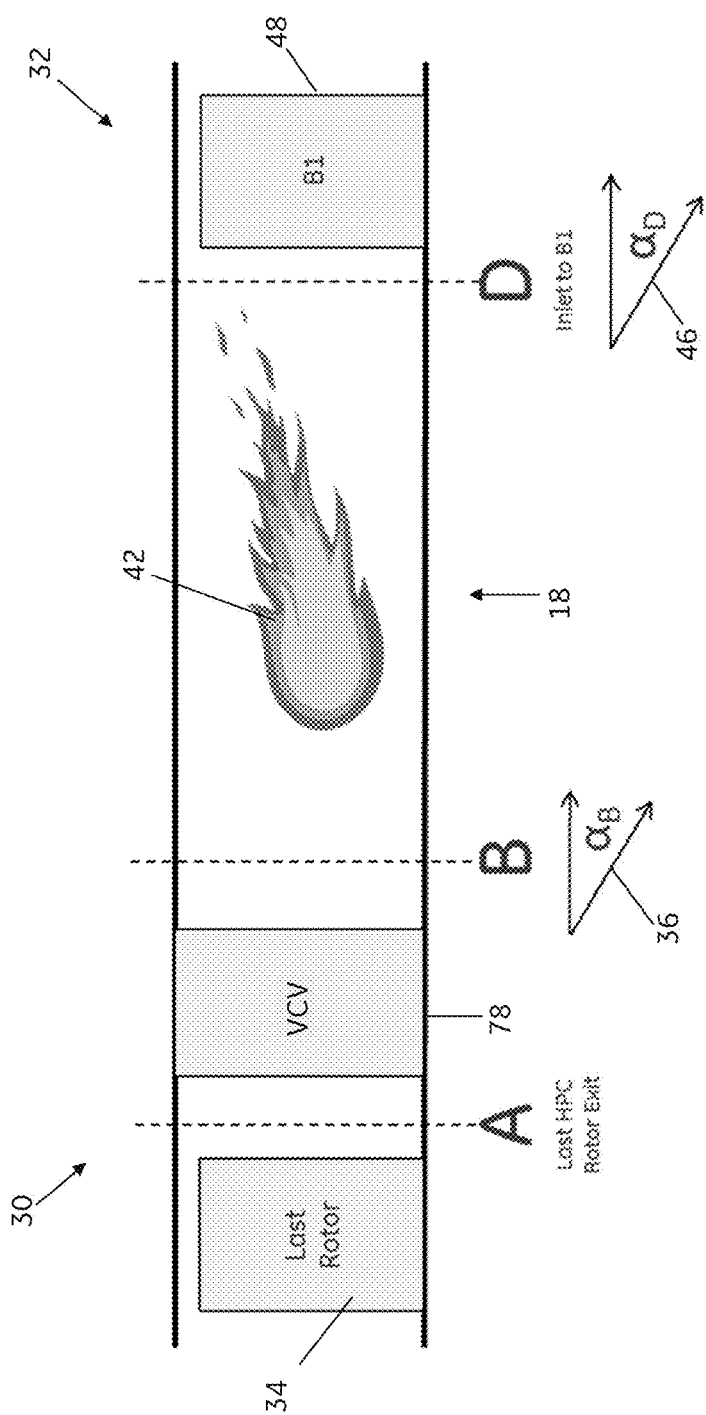
FIG. 6 is a diagrammatic schematic of the axially aft end of the compressor, the combustor and the axially fore end of the turbine engine.

FIG. 6 is a diagrammatic schematic of the axially aft end 30 of the compressor section 16, the combustor section 18, and the axially fore end 32 of the turbine section 20 with a last stage variable compressor vane (VCV) 78 and without a first stage turbine nozzle. Including a last stage variable compressor vane (VCV) 78 enables the flow angle and angular momentum to be selectively controlled to account for varying operation conditions of the gas turbine engine 10. For example, the geometry of the combustor section 18 as illustrated in FIG. 5 may be contoured so as to provide a desired flow angle at the inlet of the first stage turbine rotor 48 at a specific design point. However, when the operation of the gas turbine engine deviates from the specific design point, optional variable compressor vanes 78 may be modulated to produce the desired flow angle at the first stage turbine rotor 48. Additionally, these variable vanes may be used to change the flow rate through the machine. Thus, moving the standard choke point of the machine from aft of to before the heat addition point. Stated otherwise, the variable compressor vane 78 modulates the VCV flow area such that the VCV flow area is less than a minimum flow area of the turbine section. This may result in gaining the benefits of a variable area turbine (VAT) or variable area turbine nozzle (VATN) without the challenges associated with variable geometry components in the hot section. In the embodiment of FIG. 6, air exits the compressor section 16 after passing through the last stage variable compressor vane (VCV) 78 and enters the combustor section, where heat is added to the air in a combustion process. Combustion gases then exit the combustor section 18, and enter the turbine section 20 directly at the first stage turbine blade 48 without first passing through a stage 1 nozzle. Stated otherwise, the first stage turbine blade 48 is upstream of every nozzle stage within the turbine section 20. Similarly, every compressor rotor stage disposed within the compressor section 16 is upstream of the last stage variable compressor vane (VCV) 78.

Figure 7B:
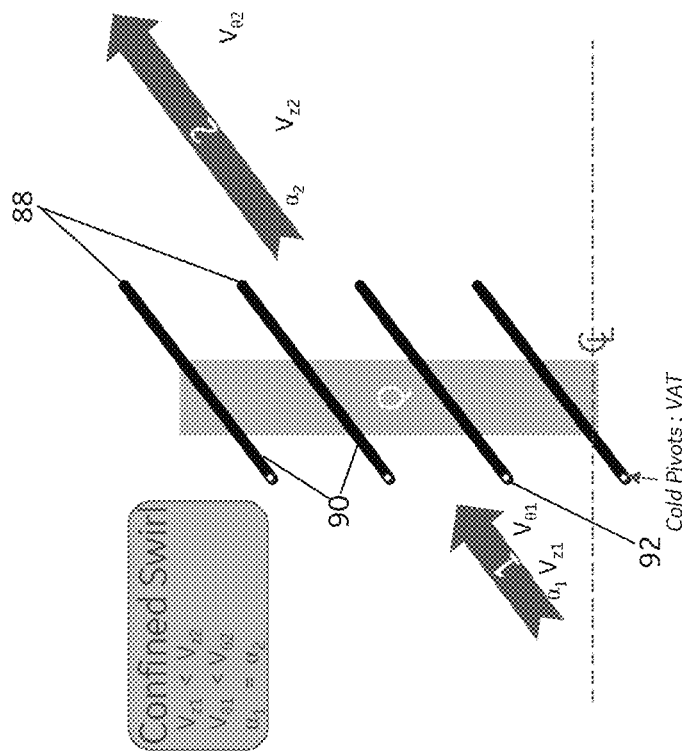
FIG. 7B is a diagrammatic schematic illustrating a confined swirl configuration of the present embodiments, including a plurality of angled vanes and resultant change in angular momentum.
Figure 7A:
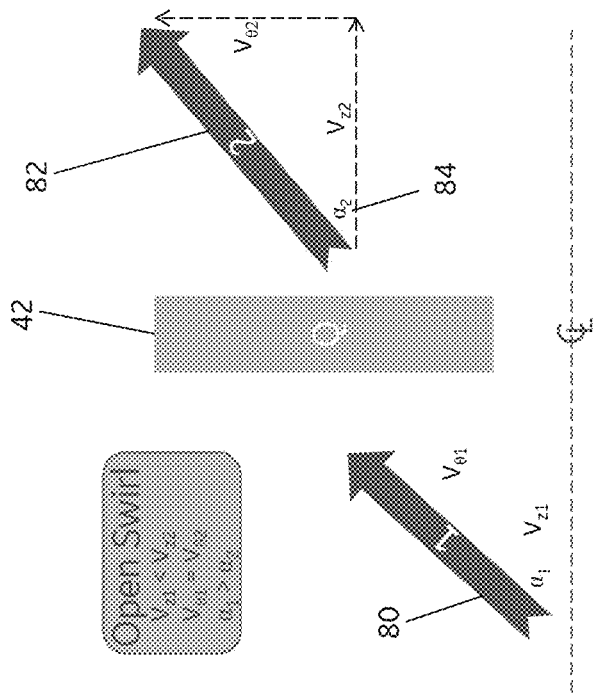
FIG. 7A is a diagrammatic schematic illustrating the change in open swirl flow angle as heat is added to the flow in the combustor section.

FIG. 7A is a diagrammatic schematic illustrating the change in flow angle as heat 42 is added to the flow in the combustor section 18. The upstream velocity 80 has a component in both the circumferential direction and the axial direction. The downstream velocity 82, after heat 42 has been added also has components in both the circumferential and axial directions. The component in the circumferential direction remains constant before and after the addition of heat 42. However, the component of the velocity in the axial direction increases as a result of heat 42 addition, thereby resulting in a decreased downstream flow angle 84. This is an open swirl embodiment.

FIG. 7B is a diagrammatic schematic illustrating a confined swirl configuration of the present embodiments, including a plurality of angled vanes 88 that guide the airflow through the combustor section 18 while heat 42 is being added. In one embodiment, the plurality of angled vanes 88 may be variable, and may include a plurality of vane actuators 90 located upstream of the location where heat 42 is added so that the vane actuators 90 do not need to withstand such high temperatures. Each vane actuator 90 may include a cold pivot 92 at the axially upstream end. The plurality of variable vane actuators 90 may produce the same effect as variable area turbine nozzles. In other embodiments, the plurality of angled vanes 88 may be fixed. In both embodiments, the confined heat addition increases the angular momentum such that the desired flow angle as required at the first stage turbine rotor 48 is achieved at the outlet of the combustor exit 68. This is a confined swirl embodiment.

Figure 8B:
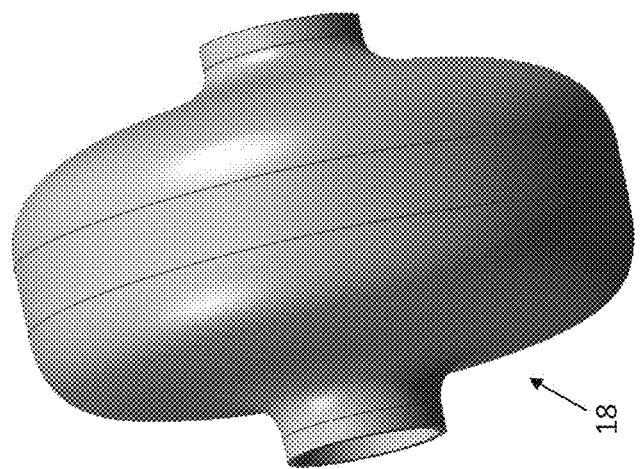
FIG. 8B is an isometric side view of the combustor section according to the present embodiments.
Figure 8A:
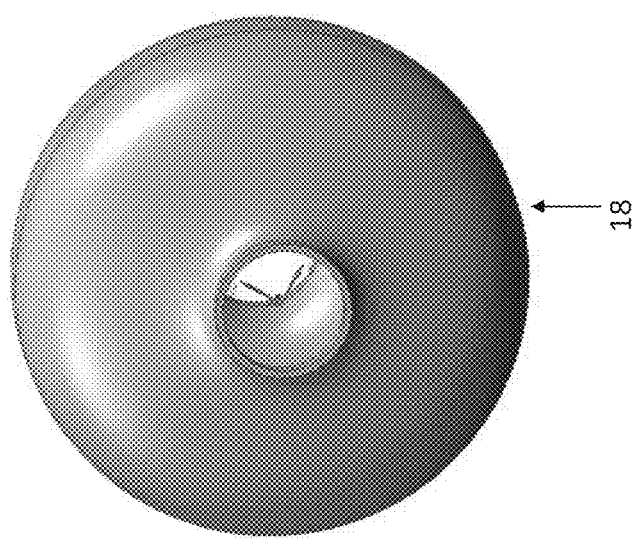
FIG. 8A is a forward-looking-aft view of the combustor section according to the present embodiments.

FIG. 8A is a forward-looking-aft view of the combustor section 18 according to the present embodiments.

FIG. 8B is an isometric side view of the combustor section 18 according to the present embodiments.

Figure 9B:
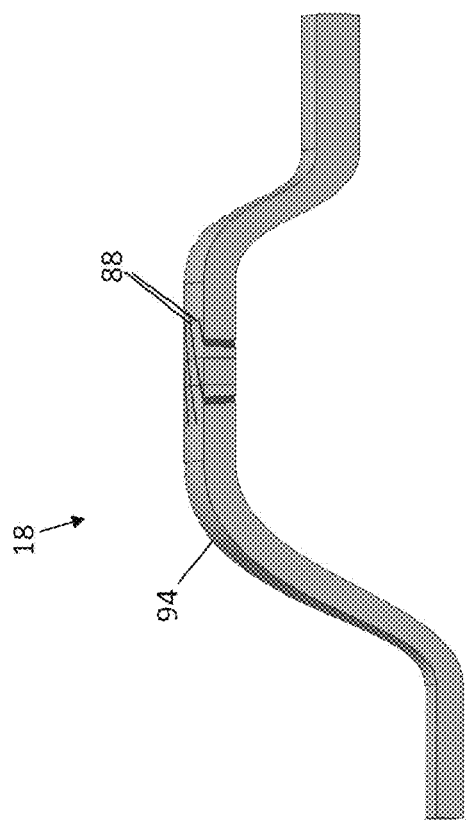
FIG. 9B is an isometric side view of the gas turbine flow path of FIG. 9A including the plurality of angled vanes according to an embodiment.
Figure 9A:
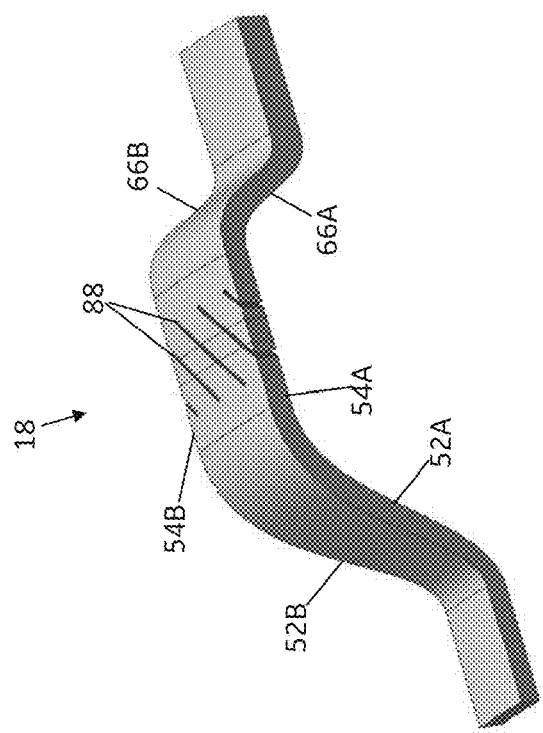
FIG. 9A is an isometric side view of a gas turbine flow path including the combustor inlet inner and outer flow paths, the combustor inner and outer flow paths, and the combustor exit inner and outer walls, respectively according to an embodiment.

FIG. 9A is an isometric side view of a gas turbine flow path 94 including the combustor inlet inner and outer flow paths, 52A and 52B, the combustor inner and outer flow paths, 54A and 54B, and the combustor exit inner and outer walls, 66A and 66B, respectively. A plurality of angled vanes 88 (which may be fixed or variable) circumferentially spaced around the combustor section 18 of the gas turbine engine 10. Each angled vane of the plurality of angled vanes 88 may be oriented such that they include a component in both the circumferential direction and the axial direction. FIG. 9A is section view of the gas turbine flow path 94, which is an annular flow path. Stated otherwise, the gas turbine flow path 94 in the section view of FIG. 9A is circumferentially rotated about an engine centerline 28.

FIG. 9B is an isometric side view of the gas turbine flow path 94 of FIG. 9A including the plurality of angled vanes 88.

Figure 10:
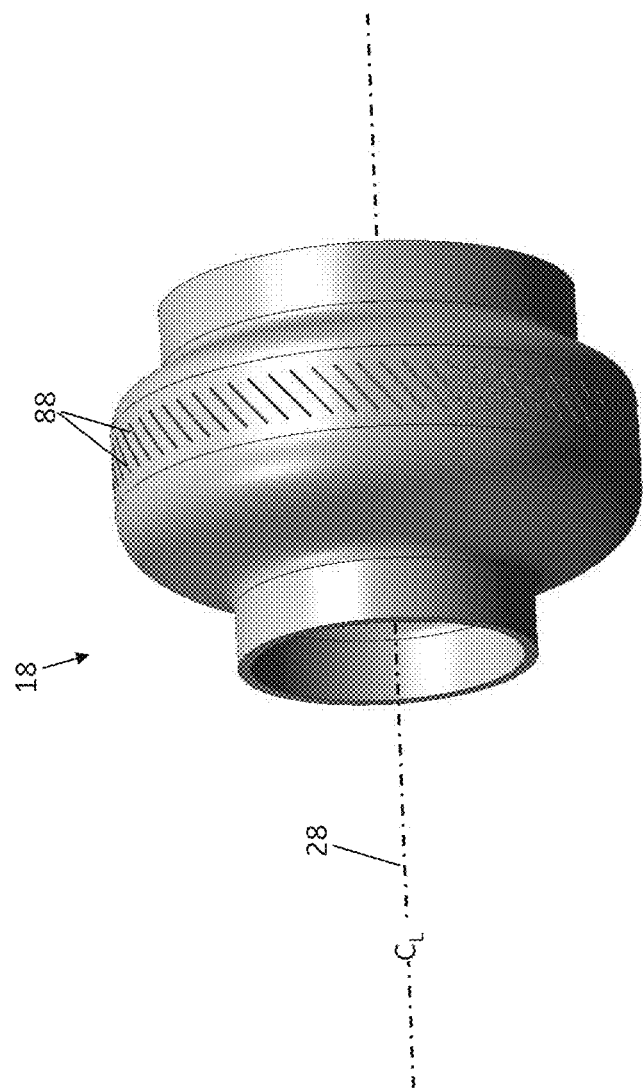
FIG. 10 is an isometric side view of the combustor section including the plurality of angled vanes spaced circumferentially around the engine centerline according to an embodiment.

FIG. 10 is an isometric side view of the combustor section 18 including the plurality of angled vanes 88 spaced circumferentially around the engine centerline 28.

Figure 11:
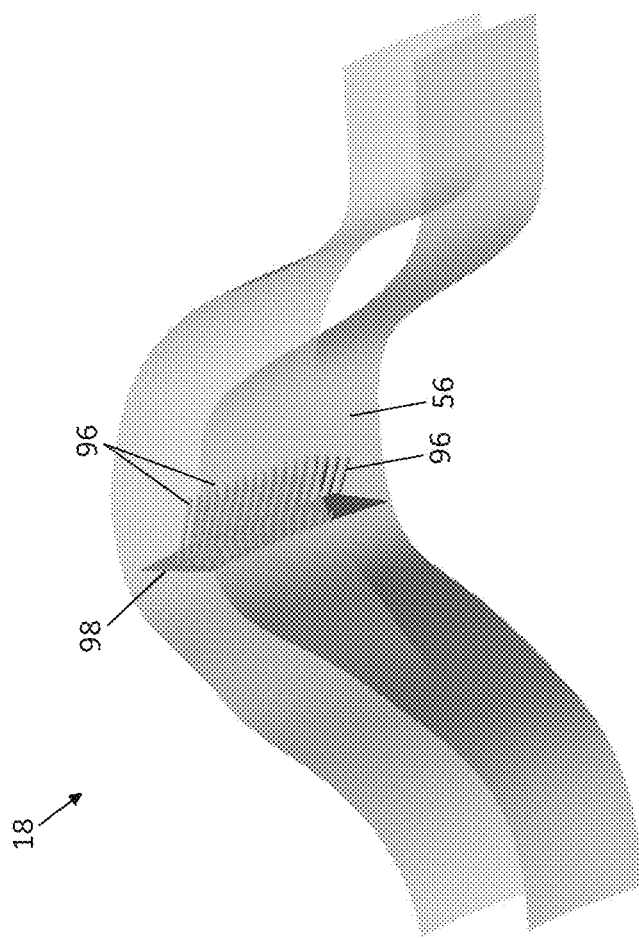
FIG. 11 is an isometric side view of the combustor section including a plurality of angled micro mixer tubes according to an embodiment.

FIG. 11 is an isometric side view of the combustor section 18 including a plurality of angled micro mixer tubes 96. Each of the plurality of angled micro mixers 96 disperses fuel and/or a fuel-air mixture into the micro mixer tubes such that heat (not shown) is added to the flow. Each micro mixer 96 is a substantially cylindrical tube oriented so as to have a component in the axial direction as well as the circumferential direction. The plurality of angled micro mixers 96 are supported by a mounting structure 98 extending circumferentially around the combustor cavity 56. Because the micro mixers 96 are angled, they produce the desired flow angle at the first stage turbine rotor 48 (downstream). Additionally, the orientation of the micro mixers 96 may be variable so as to produce the desired flow angle and angular momentum at varying gas turbine operating conditions.

Figure 12:
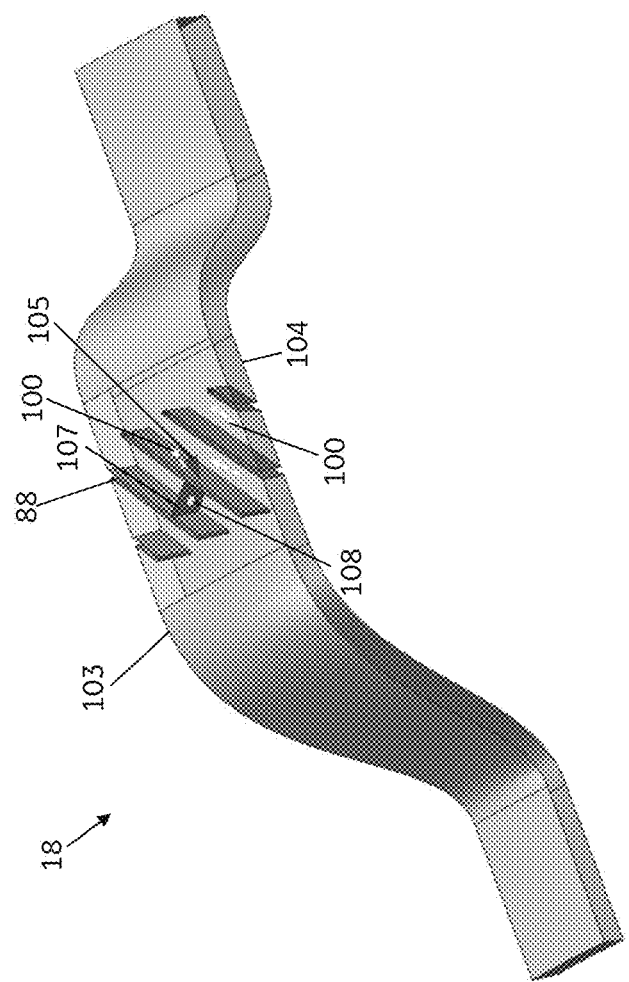
FIG. 12 is an isometric side view of the combustor section including a plurality of angled vanes according to an embodiment.

FIG. 12 is an isometric side view of the combustor section 18 including a plurality of angled vanes 88. In a first embodiment, the combustor section 18 may include a first fuel injector 100 either disposed within the vane 88, or protruding from a radially inner hub 104 or via a radially outer casing 103. Furthermore, additional flame holder devices 105 may be located between the vanes or as protrusions 105 extending from the vanes, or as angled bulkheads 107 and air swirlers 106 (shown in FIG. 13). The angled bulkhead 107 may be disposed between adjacent angled vanes 88 and may include the swirler 106 (shown in FIG. 13) and/or a second fuel injector 108.

Figure 13:
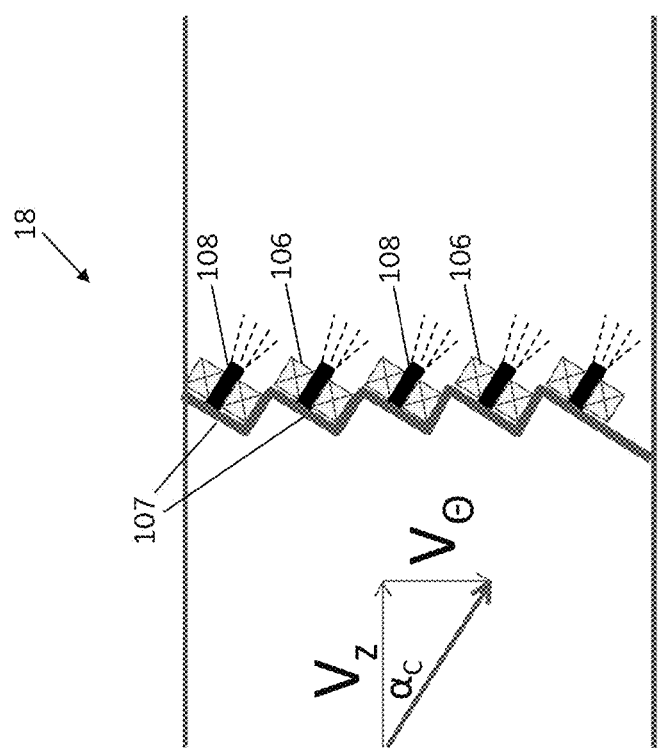
FIG. 13 is a side view of the combustor section in a corrugated combustor dome arrangement, including a plurality of angled bulkheads, each including an air swirler circumferentially disposed around a substantially cylindrical fuel injector according to an embodiment.

FIG. 13 is a side view of the combustor section 18 in a corrugated combustor dome arrangement, including a plurality of angled bulkheads 107, each including an air swirler 106 circumferentially disposed around a substantially cylindrical fuel injector 108.

Figure 14B:
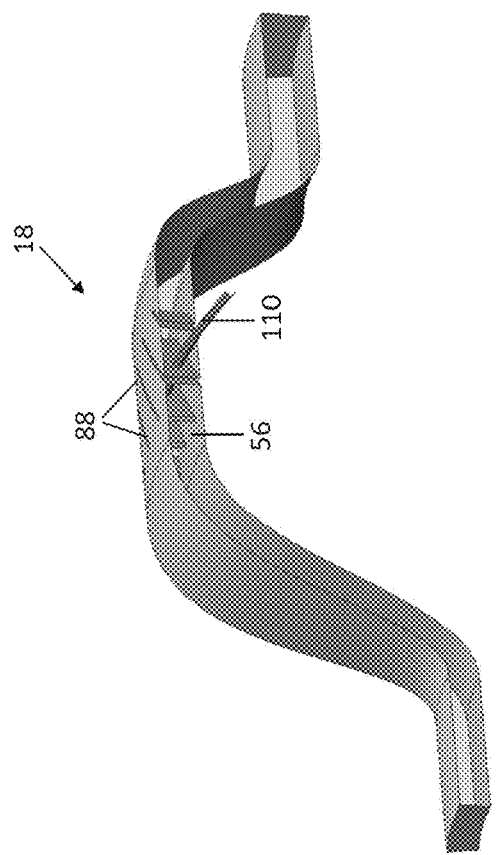
FIG. 14B is an isometric side view of the combustor section including a V-gutter style flame holder and a plurality of angled vanes spaced circumferentially around the annular combustor cavity according to an embodiment.
Figure 14A:
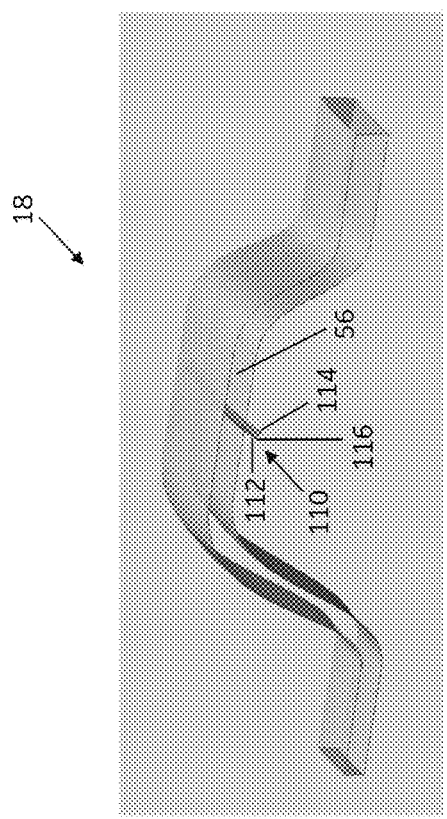
FIG. 14A is an isometric side view of the combustor section including a V-gutter style flame holder extending circumferentially around the annular combustor cavity according to an embodiment.

FIG. 14A is an isometric side view of the combustor section 18 including a V-gutter style flame holder 110 extending circumferentially around the annular combustor cavity 56. As air flows past an outer wing 112 and an inner wing 114 of the V-gutter style flame holder 110, a vortex forms downstream of the V-gutter style flame holder 110 encouraging mixing with fuel dispensed from a center location 116 of the V-gutter style flame holder 110.

FIG. 14B is an isometric side view of the combustor section 18 including a V-gutter style flame holder 110 and a plurality of angled vanes 88 spaced circumferentially around the annular combustor cavity 56.

Each of the embodiments shown in FIGS. 6, 7B, 9A, 9B, 10-12, and 14B includes a potential mechanism for adjusting the swirl in the combustor section 18 to adapt with the operating condition such that the desired downstream flow angle is achieved at the first stage turbine rotor 48.

The confined swirl embodiments of FIGS. 7B, 9A, 9B, 10-12, and 14B may serve to reduce the required combustor mean radius 60.

The gas turbine engine 10, combustor assembly 18 and embodiments described herein reduce the engine length, reduce the engine part count by eliminating the first stage turbine nozzle 44 and/or the compressor exit guide vane 38, reduce the cooling flow, reduce losses, and simplify the assembly processes.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
    a compressor section, the compressor section comprising a compressor mean radius;
    a combustor section fluidly coupled downstream of the compressor section, the combustor section comprising a combustor mean radius, a plurality of angled vanes circumferentially spaced within the combustor section, and a plurality of swirlers positioned between the angled vanes; and
    a turbine section fluidly coupled downstream of the combustor section, the turbine section comprising a first stage turbine rotor and a turbine mid-span radius,
    wherein the combustor mean radius is greater than each of the compressor mean radius and the turbine mid-span radius,
    wherein heat addition between the plurality of angled vanes increases angular momentum of airflow,
    further wherein a geometry of the combustor section is contoured to provide a desired flow angle at an inlet of the first stage turbine rotor.

2. The engine of claim 1, the turbine section further comprising: a turbine inner wall defining a radially inner boundary of a turbine flow path; a turbine outer wall defining a radially outer boundary of the turbine flow path; and at least one first stage turbine blade, the at least one first stage turbine blade comprising a leading edge, wherein the turbine mid-span radius is defined as an average of a turbine inner wall radius and a turbine outer wall radius at the leading edge of the at least one first stage turbine blade.

3. The engine of claim 2, the combustor section further comprising: a combustor inner wall defining a combustor inner wall radius; and a combustor outer wall defining a combustor outer wall radius, wherein the combustor mean radius is defined as an average of the combustor inner wall radius and the combustor outer wall radius, wherein a combustor span is defined as a difference between the combustor inner wall and the combustor outer wall, and wherein each of the combustor span and the combustor mean radius collectively define at least one flow condition within the engine.

4. The engine of claim 3, the compressor section further comprising the compressor mean radius, the compressor mean radius defined as an average of a compressor outer wall radius and a compressor inner wall radius.

5. The engine of claim 4, wherein each of the compressor mean radius, the combustor mean radius, and the turbine mid-span radius are different.

6. The engine of claim 4, wherein the compressor mean radius is substantially equal to the turbine mid-span radius.

7. The engine of claim 1, wherein the combustor mean radius is between 1.5 and 5.0 times greater than the turbine mid-span radius.

8. The engine of claim 2, wherein combustion gases exiting the combustion section flow past the at least one first stage turbine blade prior to flowing past any turbine nozzle.

9. The engine of claim 2, the turbine section comprising at least one turbine nozzle, wherein the at least one first stage turbine blade is upstream of the at least one turbine nozzle, and
    wherein the at least one turbine nozzle is the most upstream turbine nozzle disposed within the turbine section.

10. The engine of claim 1, the turbine section further comprising an upstream-most turbine nozzle, wherein the upstream-most turbine nozzle is downstream of at least one first stage turbine blade.

11. The engine of claim 5, wherein the turbine mid-span radius is greater than the compressor mean radius.

12. A gas turbine engine comprising: a compressor section, the compressor section comprising: a compressor mean radius; at least one compressor rotor blade; and a variable compressor vane (VCV); a combustor section fluidly coupled downstream of the compressor section, the combustor section comprising a combustor mean radius, a plurality of angled vanes circumferentially spaced within the combustor section, and a plurality of swirlers positioned between the angled vanes; and a turbine section fluidly coupled downstream of the combustor section, the turbine section comprising a first stage turbine rotor and a turbine mid-span radius, wherein the variable compressor vane is downstream of the at least one compressor rotor blade, wherein heat addition between the plurality of angled vanes increases angular momentum of airflow, and further wherein a geometry of the combustor section is contoured to provide a desired flow angle at an inlet of the first stage turbine rotor.

13. The engine of claim 12, wherein the combustor mean radius is greater than each of the compressor mean radius, and the turbine mid-span radius, and
    wherein the variable compressor vane is disposed downstream of an aft-most compressor rotor blade.

14. The engine of claim 12, the compressor section further comprising a plurality of compressor rotor stages,
wherein the variable compressor vane is downstream of each compressor rotor stage of the plurality of compressor rotor stages.

15. The engine of claim 12, the variable compressor vane comprising a VCV flow area,
wherein the variable compressor vane modulates the VCV flow area such that the VCV flow area is less than a minimum flow area of the turbine section.

16. The engine of claim 12, the variable compressor vane comprising a VCV flow area,
wherein the variable compressor vane modulates the VCV flow area therethrough such that a choke point of the gas turbine engine is upstream of the combustor section.

17. A gas turbine engine comprising: a compressor section, the compressor section comprising a compressor mean radius; a combustor section fluidly coupled downstream of the compressor section, the combustor section comprising: a combustor mean radius; a plurality of angled vanes circumferentially spaced within the combustor section; a plurality of swirlers positioned between the angled vanes, and a turbine section fluidly coupled downstream of the combustor section, the turbine section comprising a first stage turbine rotor and a turbine mid-span radius, wherein the plurality of angled vanes guide air through the combustor section while heat is added to the air, further wherein a geometry of the combustor section is contoured to provide a desired flow angle at an inlet of the first stage turbine rotor.

18. The engine of claim 17, wherein the heat added to the air between the plurality of angled vanes increases a flow angular momentum.

19. The engine of claim 17, wherein each vane of the plurality of angled vanes is angled so as to include a component in both of a circumferential direction and an axial direction.

20. The engine of claim 17 further comprising at least one vane actuator coupled to at least one vane of the plurality of angled vanes,
where the at least one vane actuator is disposed upstream of a location where the heat is added to the air.

\* \* \* \* \*